(12) United States Patent
Mejdrich et al.

(10) Patent No.: US 7,926,009 B2
(45) Date of Patent: *Apr. 12, 2011

(54) DUAL INDEPENDENT AND SHARED RESOURCE VECTOR EXECUTION UNITS WITH SHARED REGISTER FILE

(75) Inventors: Eric Oliver Mejdrich, Rochester, MN (US); Adam James Muff, Rochester, MN (US); Matthew Ray Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 574 days.

This patent is subject to a terminal disclaimer.

(21) Appl. No.: 11/924,980

(22) Filed: Oct. 26, 2007

(65) Prior Publication Data

US 2008/0082783 A1   Apr. 3, 2008

Related U.S. Application Data

(63) Continuation-in-part of application No. 11/536,146, filed on Sep. 28, 2006.

(51) Int. Cl.
G06F 17/50 (2006.01)
(52) U.S. Cl. .................. 716/100; 716/101; 716/136
(58) Field of Classification Search .................. 716/1–5, 716/100–101, 136; 712/2, 7–9, 222
See application file for complete search history.

(56) References Cited

U.S. PATENT DOCUMENTS

| 4,685,076 A | 8/1987 | Yoshida |
| 5,019,968 A | 5/1991 | Wang et al. |
| 5,261,113 A | 11/1993 | Jouppi |
| 7,339,837 B2 * | 3/2008 | Oberlaender et al. ... 365/189.08 |
| 2003/0208733 A1 * | 11/2003 | Sokolov ............................. 716/4 |
| 2004/0015682 A1 * | 1/2004 | Barlow et al. ................. 712/228 |
| 2005/0251644 A1 | 11/2005 | Maher et al. |
| 2007/0198815 A1 * | 8/2007 | Liu et al. ........................ 712/221 |

FOREIGN PATENT DOCUMENTS

| WO | 01/98891 A1 | 12/2001 |
| WO | 03/100602 A2 | 12/2003 |

OTHER PUBLICATIONS

Dal Pos, Marco Antonio Simon et al, "A High Performance Processor for Real-Time Ray-Tracing Image Rendering", Aug. 10, 2005, IEEE, 48th Midwest Symposium on Circuits and Systems, 2005, pp. 867-870.

"Product Brief T1P2000 Video Processor", Telairity, 2005, pp. 1-2, XP-002476489.

* cited by examiner

*Primary Examiner* — Paul Dinh

(74) *Attorney, Agent, or Firm* — Patterson & Sheridan, LLP; James R. Nock

(57) ABSTRACT

The present invention is generally related to integrated circuit devices, and more particularly, to methods, systems and design structures for the field of image processing, and more specifically to vector units for supporting image processing. A dual vector unit implementation is described wherein two vector units are configured receive data from a common register file. The vector units may independently and simultaneously process instructions. Furthermore, the vector units may be adapted to perform scalar operations thereby integrating the vector and scalar processing. The vector units may also be configured to share resources to perform an operation, for example, a cross product operation.

6 Claims, 11 Drawing Sheets

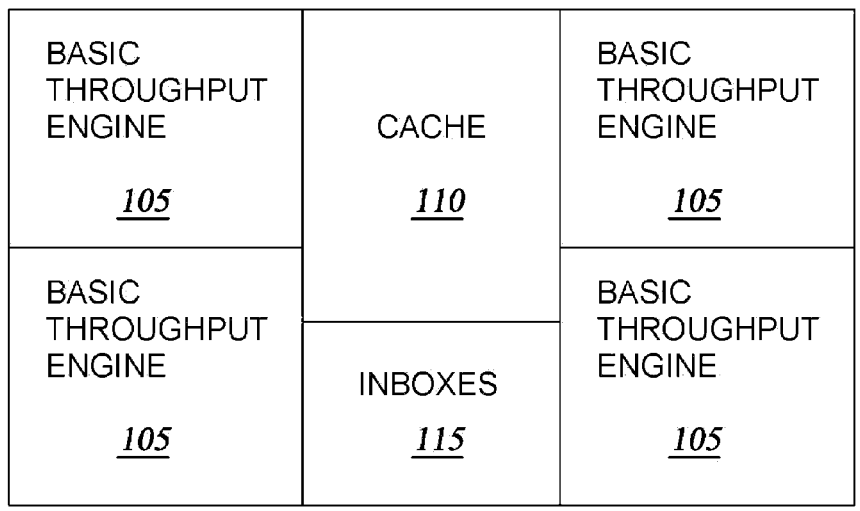
Fig. 1
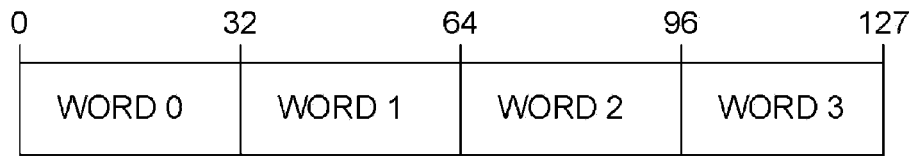
Fig. 6
```
      ⎧ vperm  v1, v2      # move into the desired position for the first mult
 901 ⎨  vperm  v3, v4      # move into the desired position for the first mult
      ⎪ vperm  v5, v6      # for second mult
      ⎩ vperm  v7, v8      # for second mult
 902 →  vmul   v9, v1, v3  # first multiply
 903 →  vmul   v9, v1, v3  # second multiply and substract step
```
Fig. 9A $$\begin{cases} A = (x_a, y_a, z_a) \\ B = (x_b, y_b, z_b) \\ N = A \times B = \begin{vmatrix} \hat{x} & \hat{y} & \hat{z} \\ x_a & y_a & z_a \\ x_b & y_b & z_b \end{vmatrix} = \begin{array}{l} \hat{x}(y_a z_b - y_b z_a) + \\ \hat{y}(x_b z_a - x_a z_b) + \\ \hat{z}(x_a y_b - x_b y_a) \end{array} \end{cases}$$

DUAL INDEPENDENT AND SHARED RESOURCE VECTOR EXECUTION UNITS WITH SHARED REGISTER FILE

CROSS-REFERENCE TO RELATED APPLICATIONS

This application is a continuation-in-part of co-pending U.S. patent application Ser. No. 11/536,146, filed Sep. 28, 2006, which is herein incorporated by reference.

BACKGROUND OF THE INVENTION

1. Field of the Invention

The present invention is generally related to integrated circuit devices, and more particularly, to methods, systems and design structures for the field of image processing, and more specifically to vector units for supporting image processing.

2. Description of the Related Art

The process of rendering two-dimensional images from three-dimensional scenes is commonly referred to as image processing. A particular goal of image processing is to make two-dimensional simulations or renditions of three-dimensional scenes as realistic as possible. This quest for rendering more realistic scenes has resulted in an increasing complexity of images and innovative methods for processing the complex images.

Two-dimensional images representing a three-dimensional scene are typically displayed on a monitor or some type of display screen. Modern monitors display images through the use of pixels. A pixel is the smallest area of space which can be illuminated on a monitor. Most modern computer monitors use a combination of hundreds of thousands or millions of pixels to compose the entire display or rendered scene. The individual pixels are arranged in a grid pattern and collectively cover the entire viewing area of the monitor. Each individual pixel may be illuminated to render a final picture for viewing.

One method for rendering a real world three-dimensional scene onto a two-dimensional monitor using pixels is called rasterization. Rasterization is the process of taking a two-dimensional image represented in vector format (mathematical representations of geometric objects within a scene) and converting the image into individual pixels for display on the monitor. Rasterization is effective at rendering graphics quickly and using relatively low amounts of computational power; however, rasterization suffers from some drawbacks. For example, rasterization often suffers from a lack of realism because it is not based on the physical properties of light, rather rasterization is based on the shape of three-dimensional geometric objects in a scene projected onto a two-dimensional plane. Furthermore, the computational power required to render a scene with rasterization scales directly with an increase in the complexity of objects in the scene to be rendered. As image processing becomes more realistic, rendered scenes become more complex. Therefore, rasterization suffers as image processing evolves, because rasterization scales directly with complexity.

Another method for rendering a real world three-dimensional scene onto a two-dimensional monitor using pixels is called ray tracing. The ray tracing technique traces the propagation of imaginary rays, which behave similar to rays of light, into a three-dimensional scene which is to be rendered onto a computer screen. The rays originate from the eye(s) of a viewer sitting behind the computer screen and traverse through pixels, which make up the computer screen, towards the three-dimensional scene. Each traced ray proceeds into the scene and may intersect with objects within the scene. If a ray intersects an object within the scene, properties of the object and several other contributing factors, for example, the effect of light sources, are used to calculate the amount of color and light, or lack thereof, the ray is exposed to. These calculations are then used to determine the final color of the pixel through which the traced ray passed.

The process of tracing rays is carried out many times for a single scene. For example, a single ray may be traced for each pixel in the display. Once a sufficient number of rays have been traced to determine the color of all of the pixels which make up the two-dimensional display of the computer screen, the two-dimensional synthesis of the three-dimensional scene can be displayed on the computer screen to the viewer.

Ray tracing typically renders real world three-dimensional scenes with more realism than rasterization. This is partially due to the fact that ray tracing simulates how light travels and behaves in a real world environment, rather than simply projecting a three-dimensional shape onto a two-dimensional plane as is done with rasterization. Therefore, graphics rendered using ray tracing more accurately depict on a monitor what our eyes are accustomed to seeing in the real world.

Furthermore, ray tracing also handles increasing scene complexity better than rasterization. Ray tracing scales logarithmically with scene complexity. This is due to the fact that the same number of rays may be cast into a scene, even if the scene becomes more complex. Therefore, ray tracing does not suffer in terms of computational power requirements as scenes become more complex unlike rasterization.

However, one major drawback of ray tracing is the large number of floating point calculations, and thus increased processing power, required to render scenes. This leads to problems when fast rendering is needed, for example, when an image processing system is to render graphics for animation purposes such as in a game console. Due to the increased computational requirements for ray tracing it is difficult to render animation quickly enough to seem realistic (realistic animation is approximately twenty to twenty-four frames per second).

Image processing using, for example, ray tracing, may involve performing both vector and scalar math. Accordingly, hardware support for image processing may include vector and scalar units configured to perform a wide variety of calculations. The vector and scalar operations, for example, may trace the path of light through a scene, or move objects within a three-dimensional scene. A vector unit may perform operations, for example, dot products and cross products, on vectors related to the objects in the scene. A scalar unit may perform arithmetic operations on scalar values, for example, addition, subtraction, multiplication, division, and the like.

The vector and scalar units may be pipelined to improve performance. However, performing vector operations may involve performing multiple iterations of multiple instructions which may be dependent on each other. Such dependencies between instructions may reduce the efficiency of the pipelined units. For example, several pipeline stages may be left unused in order for a first instruction to complete prior to execution of a second instruction.

Furthermore, image processing computations may involve heavy interaction between vector and scalar units. Because the prior art implements vector and scalar units that can be independently issued to, and having their own respective register files, transferring data between the units is usually very inefficient. For example, a scalar unit may load data from memory into its associated register file to perform a scalar operation. The results of the calculation may then be stored back in memory. Subsequently, the results from the scalar calculation may be loaded into a separate register file associated with a vector unit to perform a vector operation.

The transfer of data to and from memory to transfer the data between scalar and vector units, and the dependencies between instructions may introduce significant delays that slow down processing of images, thereby adversely affecting the ability to render realistic images and animation.

Therefore, what is needed are more efficient methods, systems, and articles of manufacture for performing ray tracing.

SUMMARY OF THE INVENTION

The present invention is generally related to the field of image processing, and more specifically to vector units for supporting image processing.

One embodiment of the invention provides a processor generally comprising a first vector unit and a second vector unit. The first vector unit and the second vector unit may each generally comprise a plurality of vector processing lanes configured to execute a vector instruction and at least one scalar processing lane configured to execute a scalar instruction, the first vector unit and the second vector unit being configured to independently and simultaneously execute instructions.

Another embodiment of the invention provides a method for processing instructions. The method generally comprises issuing a first instruction to a first vector unit and simultaneously issuing a second instruction to a second vector unit wherein the first vector unit and the second vector unit are configured to independently and simultaneously process the first instruction and the second instruction.

Yet another embodiment of the invention provides a system generally comprising a plurality of processors communicably coupled with one another. Each processor may generally comprise a first vector unit and a second vector unit. The first vector unit and the second vector unit may each generally comprise a plurality of vector processing lanes configured to execute a vector instruction and at least one scalar processing lane configured to execute a scalar instruction, the first vector unit and the second vector unit being configured to independently and simultaneously execute instructions.

Yet another embodiment of the invention provides a design structure embodied in a machine readable medium for at least one of designing, manufacturing, and testing a design. The design structure generally includes a processor having a first vector unit and a second vector unit. The first vector unit and the second vector unit each comprise a plurality of vector processing lanes configured to execute a vector instruction and at least one scalar processing lane configured to execute a scalar instruction, the first vector unit and the second vector unit being configured to independently and simultaneously execute instructions.

Yet another embodiment of the invention provides a design structure embodied in a machine readable medium for at least one of designing, manufacturing, and testing a design, where the design structure generally includes a system having a plurality of processors communicably coupled with one another. Each processor comprises a first vector unit and a second vector unit. The first vector unit and the second vector unit each comprise a plurality of vector processing lanes configured to execute a vector instruction and at least one scalar processing lane configured to execute a scalar instruction, the first vector unit and the second vector unit being configured to independently and simultaneously execute instructions.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 illustrates a multiple core processing element, according to one embodiment of the invention.

FIG. 6 illustrates a register according to an embodiment of the invention.

FIG. 9A illustrates exemplary code for performing a cross product operation, according to an embodiment of the invention.

DETAILED DESCRIPTION OF THE PREFERRED EMBODIMENTS

Figure 2:
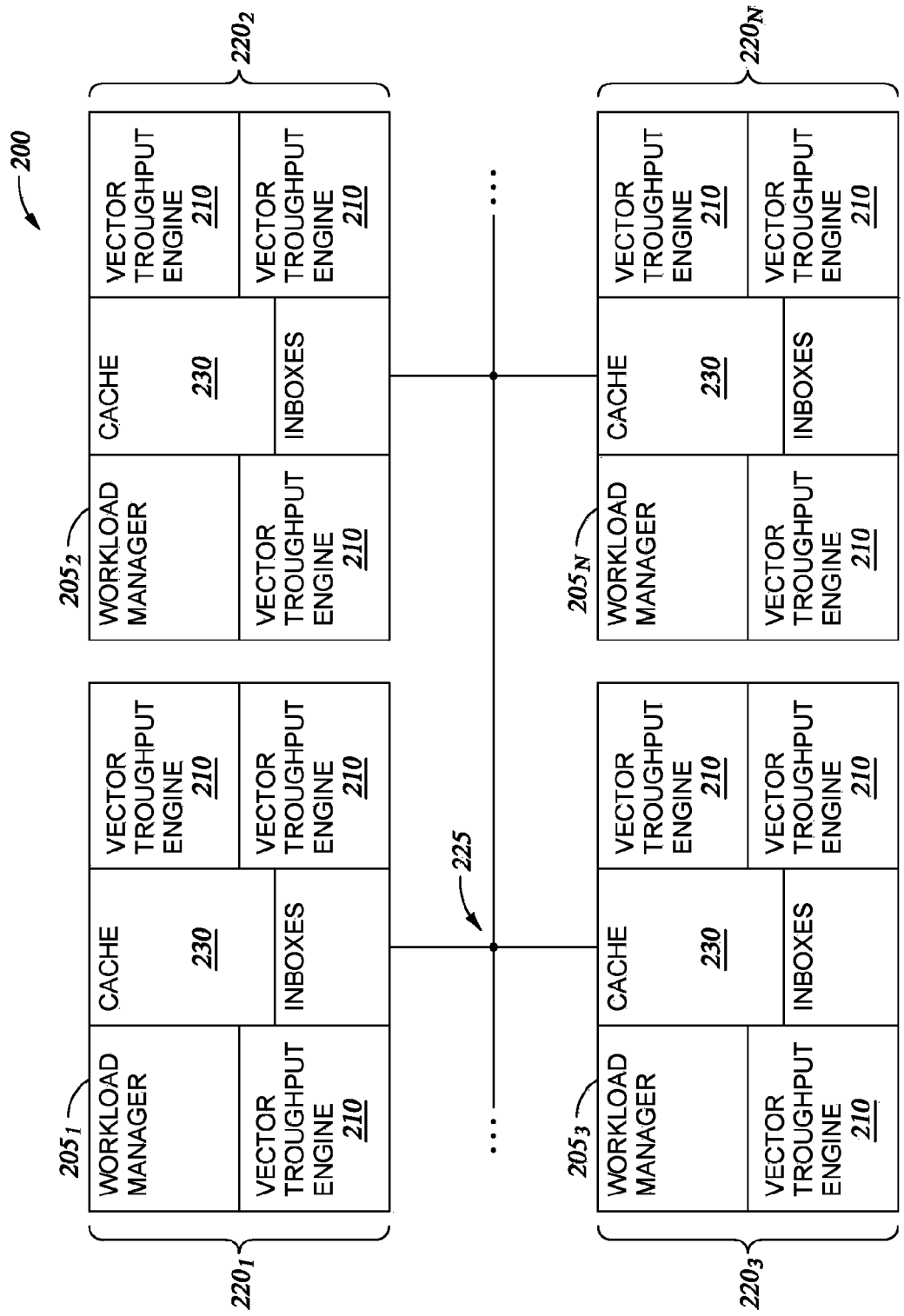
FIG. 2 illustrates a multiple core processing element network, according to an embodiment of the invention.

The present invention is generally related to the field of image processing, and more specifically to vector units for supporting image processing. A dual vector unit implementation is described wherein two vector units are configured to receive data from a common register file. The vector units may independently and simultaneously process instructions. Furthermore, the vector units may be adapted to perform scalar operations, thereby integrating the vector and scalar processing in one unit. For some embodiments, the vector units may also be configured to share resources to perform a single operation, for example, a cross product operation.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

An Exemplary Processor Layout and Communications Network

FIG. 1 illustrates an exemplary multiple core processing element 100, in which embodiments of the invention may be implemented. The multiple core processing element 100 includes a plurality of basic throughput engines 105 (BTEs). A BTE 105 may contain a plurality of processing threads and a core cache (e.g., an L1 cache). The processing threads located within each BTE may have access to a shared multiple core processing element cache 110 (e.g., an L2 cache).

The BTEs 105 may also have access to a plurality of inboxes 115. The inboxes 115 may be a memory mapped address space. The inboxes 115 may be mapped to the processing threads located within each of the BTEs 105. Each thread located within the BTEs may have a memory mapped inbox and access to all of the other memory mapped inboxes 115. The inboxes 115 make up a low latency and high bandwidth communications network used by the BTEs 105.

The BTEs may use the inboxes 115 as a network to communicate with each other and redistribute data processing work amongst the BTEs. For some embodiments, separate outboxes may be used in the communications network, for example, to receive the results of processing by BTEs 105. For other embodiments, inboxes 115 may also serve as outboxes, for example, with one BTE 105 writing the results of a processing function directly to the inbox of another BTE 105 that will use the results.

The aggregate performance of an image processing system may be tied to how well the BTEs can partition and redistribute work. The network of inboxes 115 may be used to collect and distribute work to other BTEs without corrupting the shared multiple core processing element cache 110 with BTE communication data packets that have no frame to frame coherency. An image processing system which can render many millions of triangles per frame may include many BTEs 105 connected in this manner.

In one embodiment of the invention, the threads of one BTE 105 may be assigned to a workload manager. An image processing system may use various software and hardware components to render a two-dimensional image from a three-dimensional scene. According to one embodiment of the invention, an image processing system may use a workload manager to traverse a spatial index with a ray issued by the image processing system. A spatial index may be implemented as a tree type data structure used to partition a relatively large three-dimensional scene into smaller bounding volumes. An image processing system using a ray tracing methodology for image processing may use a spatial index to quickly determine ray-bounding volume intersections. In one embodiment of the invention, the workload manager may perform ray-bounding volume intersection tests by using the spatial index.

In one embodiment of the invention, other threads of the multiple core processing element BTEs 105 on the multiple core processing element 100 may be vector throughput engines. After a workload manager determines a ray-bounding volume intersection, the workload manager may issue (send), via the inboxes 115, the ray to one of a plurality of vector throughput engines. The vector throughput engines may then determine if the ray intersects a primitive contained within the bounding volume. The vector throughput engines may also perform operations relating to determining the color of the pixel through which the ray passed.

FIG. 2 illustrates a network of multiple core processing elements 200, according to one embodiment of the invention. FIG. 2 also illustrates one embodiment of the invention where the threads of one of the BTEs of the multiple core processing element 100 is a workload manager 205. Each multiple core processing element $220_{1-N}$ in the network of multiple core processing elements 200 may contain one workload manager $205_{1-N}$, according to one embodiment of the invention. Each processor 220 in the network of multiple core processing elements 200 may also contain a plurality of vector throughput engines 210, according to one embodiment of the invention.

The workload managers $220_{1-N}$ may use a high speed bus 225 to communicate with other workload managers $220_{1-N}$ and/or vector throughput engines 210 of other multiple core processing elements 220, according to one embodiment of the invention. Each of the vector throughput engines 210 may use the high speed bus 225 to communicate with other vector throughput engines 210 or the workload managers 205. The workload manager processors 205 may use the high speed bus 225 to collect and distribute image processing related tasks to other workload manager processors 205, and/or distribute tasks to other vector throughput engines 210. The use of a high speed bus 225 may allow the workload managers $205_{1-N}$ to communicate without affecting the caches 230 with data packets related to workload manager 205 communications.

An Exemplary Three-Dimensional Scene

Figure 3:
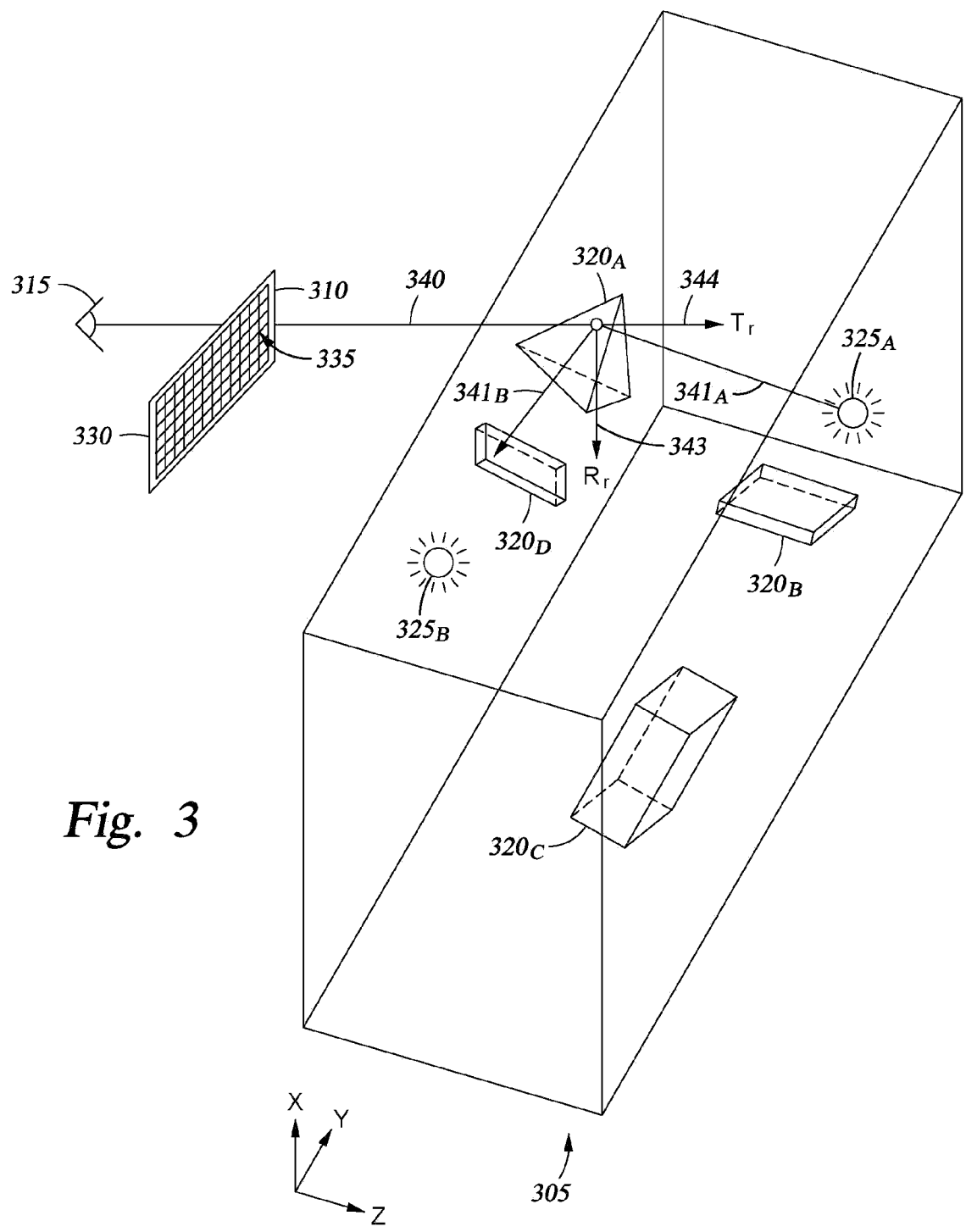
FIG. 3 is an exemplary three-dimensional scene to be rendered by an image processing system, according to one embodiment of the invention.

FIG. 3 is an exemplary three-dimensional scene 305 to be rendered by an image processing system. Within the three-dimensional scene 305 may be objects 320. The objects 320 in FIG. 3 are of different geometric shapes. Although only four objects 320 are illustrated in FIG. 3, the number of objects in a typical three-dimensional scene may be more or less. Commonly, three-dimensional scenes will have many more objects than illustrated in FIG. 3.

As can be seen in FIG. 3 the objects are of varying geometric shape and size. For example, one object in FIG. 3 is a pyramid $320_A$. Other objects in FIG. 3 are boxes $320_{B-D}$. In many modern image processing systems objects are often broken up into smaller geometric shapes (e.g., squares, circles, triangles, etc.). The larger objects are then represented by a number of the smaller simple geometric shapes. These smaller geometric shapes are often referred to as primitives.

Also illustrated in the scene 305 are light sources $325_{A-B}$. The light sources may illuminate the objects 320 located within the scene 305. Furthermore, depending on the location of the light sources 325 and the objects 320 within the scene 305, the light sources may cause shadows to be cast onto objects within the scene 305.

The three-dimensional scene 305 may be rendered into a two-dimensional picture by an image processing system. The image processing system may also cause the two-dimensional picture to be displayed on a monitor 310. The monitor 310 may use many pixels 330 of different colors to render the final two-dimensional picture.

One method used by image processing systems to render a three-dimensional scene 320 into a two-dimensional picture is called ray tracing. Ray tracing is accomplished by the image processing system "issuing" or "shooting" rays from the perspective of a viewer 315 into the three-dimensional scene 320. The rays have properties and behavior similar to light rays.

One ray 340, that originates at the position of the viewer 315 and traverses through the three-dimensional scene 305, can be seen in FIG. 3. As the ray 340 traverses from the viewer 315 to the three-dimensional scene 305, the ray 340 passes through a plane where the final two-dimensional picture will be rendered by the image processing system. In FIG. 3 this plane is represented by the monitor 310. The point the ray 340 passes through the plane, or monitor 310, is represented by a pixel 335.

As briefly discussed earlier, most image processing systems use a grid 330 of thousands (if not millions) of pixels to render the final scene on the monitor 310. Each individual pixel may display a different color to render the final composite two-dimensional picture on the monitor 310. An image processing system using a ray tracing image processing methodology to render a two-dimensional picture from a three-dimensional scene will calculate the colors that the issued ray or rays encounters in the three-dimensional scene. The image processing scene will then assign the colors encountered by the ray to the pixel through which the ray passed on its way from the viewer to the three-dimensional scene.

The number of rays issued per pixel may vary. Some pixels may have many rays issued for a particular scene to be rendered. In which case the final color of the pixel is determined by the each color contribution from all of the rays that were issued for the pixel. Other pixels may only have a single ray issued to determine the resulting color of the pixel in the two-dimensional picture. Some pixels may not have any rays issued by the image processing system, in which case their color may be determined, approximated or assigned by algorithms within the image processing system.

To determine the final color of the pixel 335 in the two-dimensional picture, the image processing system must determine if the ray 340 intersects an object within the scene. If the ray does not intersect an object within the scene it may be assigned a default background color (e.g., blue or black, representing the day or night sky). Conversely, as the ray 340 traverses through the three-dimensional scene the ray 340 may strike objects. As the rays strike objects within the scene the color of the object may be assigned the pixel through which the ray passes. However, the color of the object must be determined before it is assigned to the pixel.

Many factors may contribute to the color of the object struck by the original ray 340. For example, light sources within the three-dimensional scene may illuminate the object. Furthermore, physical properties of the object may contribute to the color of the object. For example, if the object is reflective or transparent, other non-light source objects may then contribute to the color of the object.

In order to determine the effects from other objects within the three-dimensional scene, secondary rays may be issued from the point where the original ray 340 intersected the object. For example, one type of secondary ray may be a shadow ray. A shadow ray may be used to determine the contribution of light to the point where the original ray 340 intersected the object. Another type of secondary ray may be a transmitted ray. A transmitted ray may be used to determine what color or light may be transmitted through the body of the object. Furthermore, a third type of secondary ray may be a reflected ray. A reflected ray may be used to determine what color or light is reflected onto the object.

As noted above, one type of secondary ray may be a shadow ray. Each shadow ray may be traced from the point of intersection of the original ray and the object, to a light source within the three-dimensional scene 305. If the ray reaches the light source without encountering another object before the ray reaches the light source, then the light source will illuminate the object struck by the original ray at the point where the original ray struck the object.

For example, shadow ray $341_A$ may be issued from the point where original ray 340 intersected the object $320_A$, and may traverse in a direction towards the light source $325_A$. The shadow ray $341_A$ reaches the light source $325_A$ without encountering any other objects 320 within the scene 305. Therefore, the light source $325_A$ will illuminate the object $320_A$ at the point where the original ray 340 intersected the object $320_A$.

Other shadow rays may have their path between the point where the original ray struck the object and the light source blocked by another object within the three-dimensional scene. If the object obstructing the path between the point on the object the original ray struck and the light source is opaque, then the light source will not illuminate the object at the point where the original ray struck the object. Thus, the light source may not contribute to the color of the original ray and consequently neither to the color of the pixel to be rendered in the two-dimensional picture. However, if the object is translucent or transparent, then the light source may illuminate the object at the point where the original ray struck the object.

For example, shadow ray $341_B$ may be issued from the point where the original ray 340 intersected with the object $320_A$, and may traverse in a direction towards the light source $325_B$. In this example, the path of the shadow ray $341_B$ is blocked by an object $320_D$. If the object $320_D$ is opaque, then the light source $325_B$ will not illuminate the object $320_A$ at the point where the original ray 340 intersected the object $320_A$. However, if the object $320_D$ which the shadow ray is translucent or transparent the light source $325_B$ may illuminate the object $320_A$ at the point where the original ray 340 intersected the object $320_A$.

Another type of secondary ray is a transmitted ray. A transmitted ray may be issued by the image processing system if the object with which the original ray intersected has transparent or translucent properties (e.g., glass). A transmitted ray traverses through the object at an angle relative to the angle at which the original ray struck the object. For example, transmitted ray 344 is seen traversing through the object $320_A$ which the original ray 340 intersected.

Another type of secondary ray is a reflected ray. If the object with which the original ray intersected has reflective properties (e.g. a metal finish), then a reflected ray will be issued by the image processing system to determine what color or light may be reflected by the object. Reflected rays traverse away from the object at an angle relative to the angle at which the original ray intersected the object. For example, reflected ray 343 may be issued by the image processing system to determine what color or light may be reflected by the object $320_A$ which the original ray 340 intersected.

The total contribution of color and light of all secondary rays (e.g., shadow rays, transmitted rays, reflected rays, etc.) will result in the final color of the pixel through which the original ray passed.

Vector Operations

Processing images may involve performing one or more vector operations to determine, for example, intersection of rays and objects, generation of shadow rays, reflected rays, and the like. One common operation performed during image processing is the cross product operation between two vectors. A cross product may be performed to determine a normal vector from a surface, for example, the surface of a primitive of an object in a three-dimensional scene. The normal vector may indicate whether the surface of the object is visible to a viewer.

Figures 4, 5:
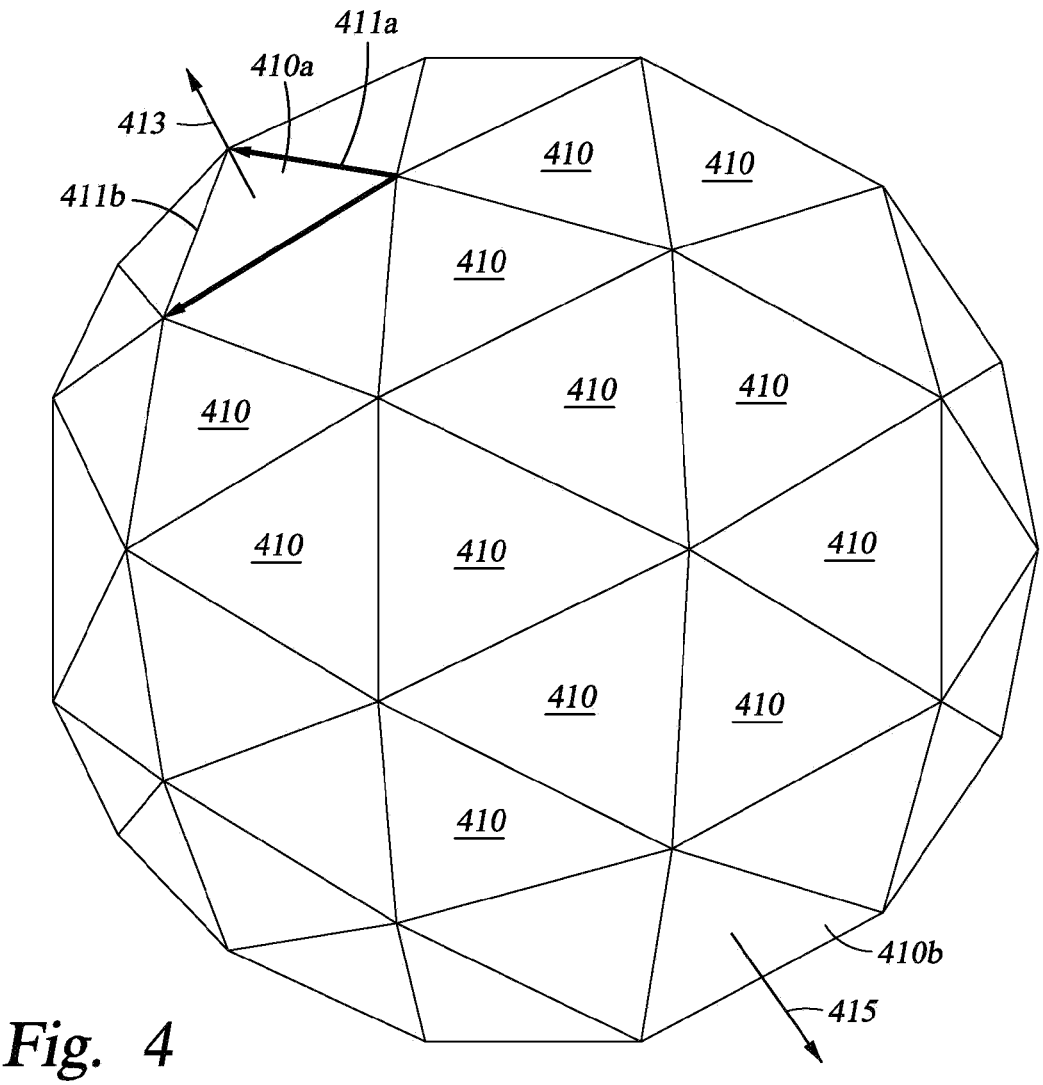
FIG. 4 illustrates a detailed view of an object to be rendered on a screen, according to an embodiment of the invention.
FIG. 5 illustrates a cross product operation.

As previously described, each object in a scene may be represented as a plurality of primitives connected to one another to form the shape of the object. For example, in one embodiment, each object may be composed of a plurality of interconnected triangles. FIG. 4 illustrates an exemplary object 400 composed of a plurality of triangles 410. Object 400 may be a spherical object, formed by the plurality of triangles 410 in FIG. 4. For purposes of illustration a crude spherical object is shown. One skilled in the art will recognize that the surface of object 400 may be formed with a greater number of smaller triangles 410 to better approximate a curved object.

In one embodiment of the invention, the surface normal for each triangle 410 may be calculated to determine whether the surface of the triangle is visible to a viewer 450. To determine the surface normal for each triangle, a cross product operation may be performed between two vectors representing two sides of the triangle. For example, the surface normal 413 for triangle 410a may be computed by performing a cross product between vectors 411a and 411b.

The normal vector may determine whether a surface, for example, the surface of a primitive, faces a viewer. Referring to FIG. 4, normal vector 413 points in the direction of viewer 450. Therefore, triangle 410 may be displayed to the user. On the other hand, normal vector 415 of triangle 410b points away from viewer 450. Therefore, triangle 410b may not be displayed to the viewer.

FIG. 5 illustrates a cross product operation between two vectors A and B. As illustrated, vector A may be represented by coordinates $[X_a, Y_a, Z_a]$, and vector B may be represented by coordinates $[X_b, Y_b, Z_b]$. The cross product A X B results in a vector N that is perpendicular (normal) to a plane comprising vectors A and B. The coordinates of the normal vector, as illustrated are $[(Y_a Z_b - Y_b Z_a), (X_b Z_a - X_a Z_b), (X_a Y_b - X_b Y_a)]$. One skilled in the art will recognize that vector A may correspond to vector 411a in FIG. 4, vector B may correspond to vector 411b, and vector N may correspond to normal vector 413.

Another common vector operation performed during image processing is the dot product operation. A dot product operation may be performed to determine rotation, movement, positioning of objects in the scene, and the like. A dot product operation produces a scalar value that is independent of the coordinate system and represents an inner product of the Euclidean space. The equation below describes a dot product operation performed between the previously described vectors A and B:

$$A \cdot B = x_a \cdot x_b + y_a \cdot y_b + z_a \cdot z_b$$

Hardware Support for Performing Vector Operations

As described earlier, a vector throughput engine (VTE), for example VTE 210 in FIG. 2, may perform operations to determine whether a ray intersects with a primitive, and determine a color of a pixel through which a ray is passed. The operations performed may include a plurality of vector and scalar operations. Accordingly, VTE 210 may be configured to issue instructions to a vector unit for performing vector operations.

Vector processing may involve issuing one or more vector instructions. The vector instructions may be configured to perform an operation involving one or more operands in a first register and one or more operands in a second register. The first register and the second register may be a part of a register file associated with a vector unit. FIG. 6 illustrates an exemplary register 600 comprising one or more operands. As illustrated in FIG. 6, each register in the register file may comprise a plurality of sections, wherein each section comprises an operand.

In the embodiment illustrated in FIG. 6, register 600 is shown as a 128 bit register. Register 600 may be divided into four 32 bit word sections: word 0, word 1, word 2, and word 3, as illustrated. Word 0 may include bits 0-31, word 1 may include bits 32-63, word 2 may include bits 64-97, and word 3 may include bits 98-127, as illustrated. However, one skilled in the art will recognize that register 600 may be of any reasonable length and may include any number of sections of any reasonable length.

Each section in register 600 may include an operand for a vector operation. For example, register 600 may include the coordinates and data for a vector, for example vector A of FIG. 5. Accordingly, word 0 may include coordinate $x_a$, word 1 may include the coordinate $y_a$, and word 2 may include the coordinate $z_a$. Word 3 may include data related to a primitive associated with the vector, for example, color, transparency, and the like. In one embodiment, word 3 may be used to store scalar values. The scalar values may or may not be related to the vector coordinates contained in words 0-2.

Figure 7:
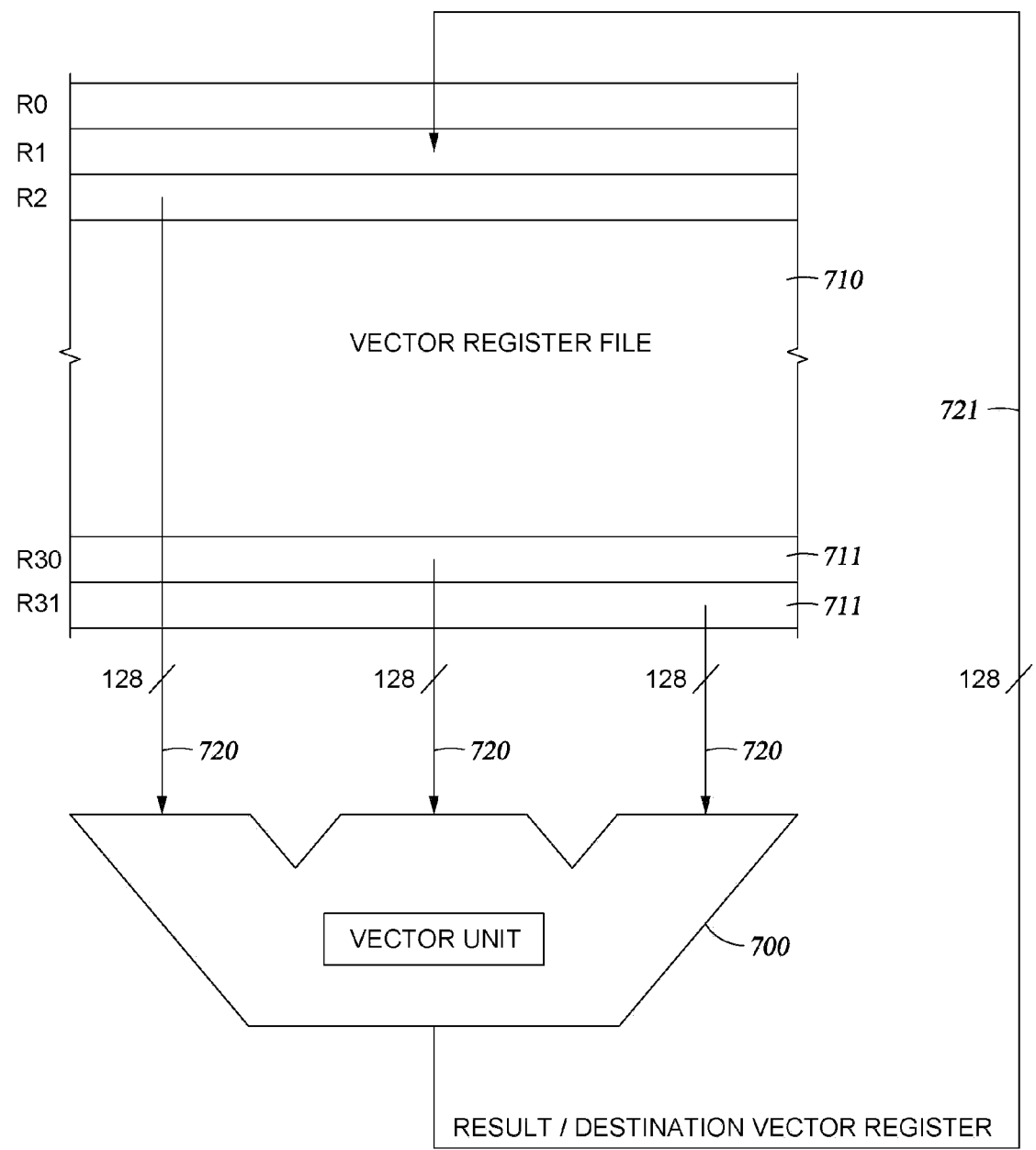
FIG. 7 illustrates a vector unit and a register file, according to an embodiment of the invention.

FIG. 7 illustrates an exemplary vector unit 700 and an associated register file 710. Vector unit 700 may be configured to execute single instruction multiple data (SIMD) instructions. In other words, vector unit 700 may operate on one or more vectors to produce a single scalar or vector result. For example, vector unit 700 may perform parallel operations on data elements that comprise one or more vectors to produce a scalar or vector result.

A plurality of vectors operated on by the vector unit may be stored in register file 710. For example, in FIG. 7, register file 710 provides 32 128-bit registers 711 (R0-R31). Each of the registers 711 may be organized in a manner similar to register 600 of FIG. 6. Accordingly, each register 711 may include vector data, for example, vector coordinates, pixel data, transparency, and the like. Data may be exchanged between register file 710 and memory, for example, cache memory, using load and store instructions. Accordingly, register file 710 may be communicable coupled with a memory device, for example, a Dynamic Random Access memory (DRAM) device.

A plurality of lanes 720 may connect register file 710 to vector unit 700. Each lane may be configured to provide input from a register file to the vector unit. For example, in FIG. 7, three 128 bit lanes connect the register file to the vector unit 700. Therefore, the contents of any 3 registers from register file 710 may be provided to the vector unit at a time.

The results of an operation computed by the vector unit may be written back to register file 710. For example, a 128 bit lane 721 provides a write back path to write results computed by vector unit 700 back to any one of the registers 711 of register file 710.

Figure 8:
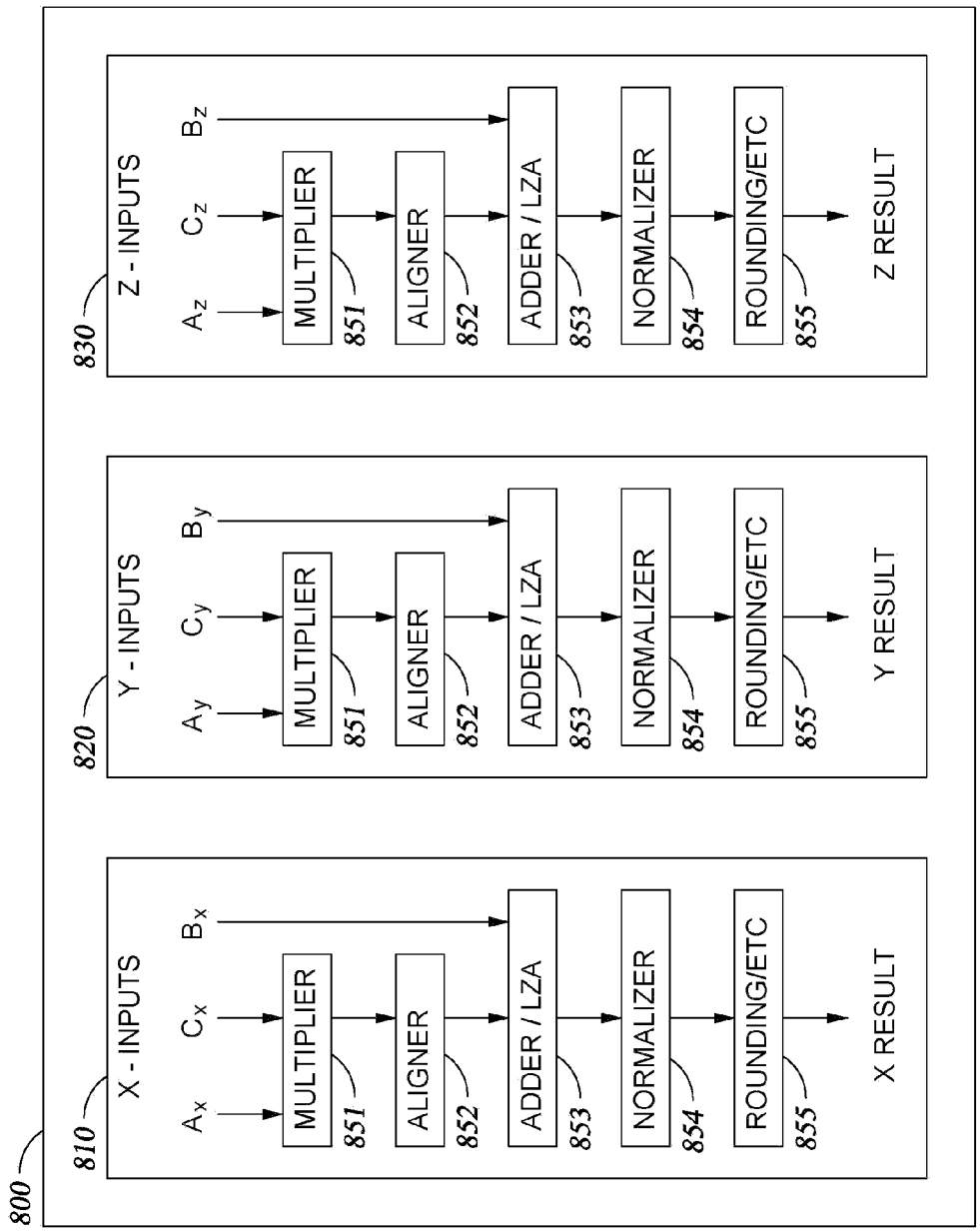
FIG. 8 illustrates a detailed view of a vector unit according to an embodiment of the invention.

FIG. 8 illustrates a detailed view of a vector unit 800. Vector unit 800 is an embodiment of the vector unit 700 depicted in FIG. 7. As illustrated in FIG. 8, vector unit 800 may include a plurality of processing lanes. For example, three processing lanes 810, 820, and 830 are shown in FIG. 8. Each processing lane may be configured to perform an operation in parallel with one or more other processing lanes. For example, each processing lane may multiply a pair of operands to perform a cross product or dot product operation. By multiplying different pairs of operands in different processing lanes of the vector unit, vector operations may be performed faster and more efficiently.

Each processing lane may be pipelined to further improve performance. Accordingly, each processing lane may include a plurality of pipeline stages for performing one or more operations on the operands. For example, each vector lane may include a multiplier 851 for multiplying a pair of operands A ($A_x$, $A_y$, $A_z$) and C ($C_x$, $C_y$, $C_z$). Operands A and C may be derived from one of the lanes coupling the register file with the vector unit, for example, lanes 720 in FIG. 7. In one embodiment of the invention, the multiplication of operands may be performed in a first stage of the pipeline as illustrated in FIG. 8.

Each processing lane may also include an aligner for aligning the product computed by multiplier 851. For example, an aligner 852 may be provided in each processing lane. Aligner 852 may be configured to adjust a decimal point of the product computed by a multiplier 851 to a desirable location in the result. For example, aligner 852 may be configured to shift the bits of the product computed multiplier 851 by one or more locations, thereby putting the product in desired format. While alignment is shown as a separate pipeline stage in FIG. 8, one skilled in the art will recognize that the multiplication and alignment may be performed in the same pipeline stage.

Each processing lane may also include an adder 853 for adding two or more operands. In one embodiment (illustrated in FIG. 8), each adder 853 is configured to receive the product computed by a multiplier, and add the product to another operand B ($B_x$, $B_y$, $B_z$). Operand B, like operands A and C, may be derived from one of the lanes connecting the register file to the vector unit. Therefore, each processing lane may be configured to perform a multiply-add instruction. One skilled in the art will recognize that multiply-add instructions are frequently performed in vector operations. Therefore, by performing several multiply add instructions in parallel lanes, the efficiency of vector processing may be significantly improved.

Each vector processing lane may also include a normalizing stage (normalizer 854), and a rounding stage (rounder 855), as illustrated in FIG. 8. Accordingly, a normalizer 854 may be provided in each processing lane. Normalizer 854 may be configured to represent a computed value in a convenient exponential format. For example, normalizer may receive the value 0.0000063 as a result of an operation. Normalizer 854 may convert the value into a more suitable exponential format, for example, $6.3 \times 10^{-6}$. The rounding stage may involve rounding a computed value to a desired number of decimal points. For example, a computed value of 10.5682349 may be rounded to 10.568 if only three decimal places are desired in the result. In one embodiment of the invention the rounder 855 may round the least significant bits of the particular precision floating point number the rounder is designed to work with.

One skilled in the art will recognize that embodiments of the invention are not limited to the particular pipeline stages, components, and arrangement of components described above and in FIG. 8. For example, in some embodiments, aligner 852 may be configured to align operand C, a product computed by the multiplier 851, or both. Furthermore, embodiments of the invention are not limited to the particular components described in FIG. 8. Any combination of the illustrated components and additional components such as, but not limited to, leading zero adders, dividers, etc. may be included in each processing lane.

Performing a Cross Product with a Single Vector Unit

Performing a cross product operation using a vector unit, for example, vector unit 800 may involve multiple instructions. For example, referring back to FIG. 5, a cross product operation requires six multiply operations and three subtraction operations. Because vector unit 800 includes three processing lanes with three multipliers, performing the cross product operation may involve multiple instructions.

FIG. 9A illustrates exemplary instructions for performing a cross product operation by issuing multiple instructions to the vector unit. Performing the cross product operation may involve issuing a plurality of permute instructions 901. The permute instructions may be configured to move the operands for performing the cross product operations into desired locations in desired registers of the register file. For example, the permute operations may transfer data from a first register to a second register. The permute instructions may also select a particular location, for example the particular word location (see FIG. 6), for transferring data from one register to another register. In one embodiment, the permute instructions may rearrange the location of data elements within the same register.

Once the operands are in the desired locations in the desired registers, a first multiply instruction 902 may be issued to perform a first set of multiply operations. The first set of multiply operations may perform one or more of the 6 multiply operations required to perform a cross product operation. For example, in one embodiment, the first set of multiply operations may perform three out of the six multiply operations. The multiple operations may be performed in each of the three processing lanes of the vector unit. The results of the first set of multiply operation may be stored back in one or more registers of the register file.

Subsequently, a second multiply instruction 903 may be issued to perform a second set of multiply operations. The second set of multiply operations may perform the remaining multiply operations of the cross product not performed in the first set of multiply operations. In one embodiment, the second instruction may involve performing both the second set of multiple operations and the subtraction operations for completing the cross product operation.

For example, referring back to FIG. 8, operands A and C may be associated with operands for performing the second set of multiply operations. The results of the second set of multiply operations may be subtracted from the results of the first set of multiply operations, or vice versa. The results of the first set of multiply operations may be provided, for example, via operands B of FIG. 8, as an input to adder 853 for performing the subtraction operation.

As previously discussed, the instructions executed by the vector unit may be pipelined. Because dependencies may exist between the permute instructions 901, first multiply instruction 902, and second multiply instruction 903, one or more pipeline stages may be stalled. For example, the first multiply instruction may not be performed until the operands are moved into the proper locations in proper registers. Therefore, the first multiply instruction may not be performed until the completion of the permute instructions, thereby requiring pipeline stalls. Similarly, because the second multiply instruction may utilize the results from the first multiply instruction, the second multiply instruction may not be executed until the completion of the first multiply instruction, thereby requiring pipeline stalls between the first multiply instruction and the second multiply instruction.

Figure 9B:
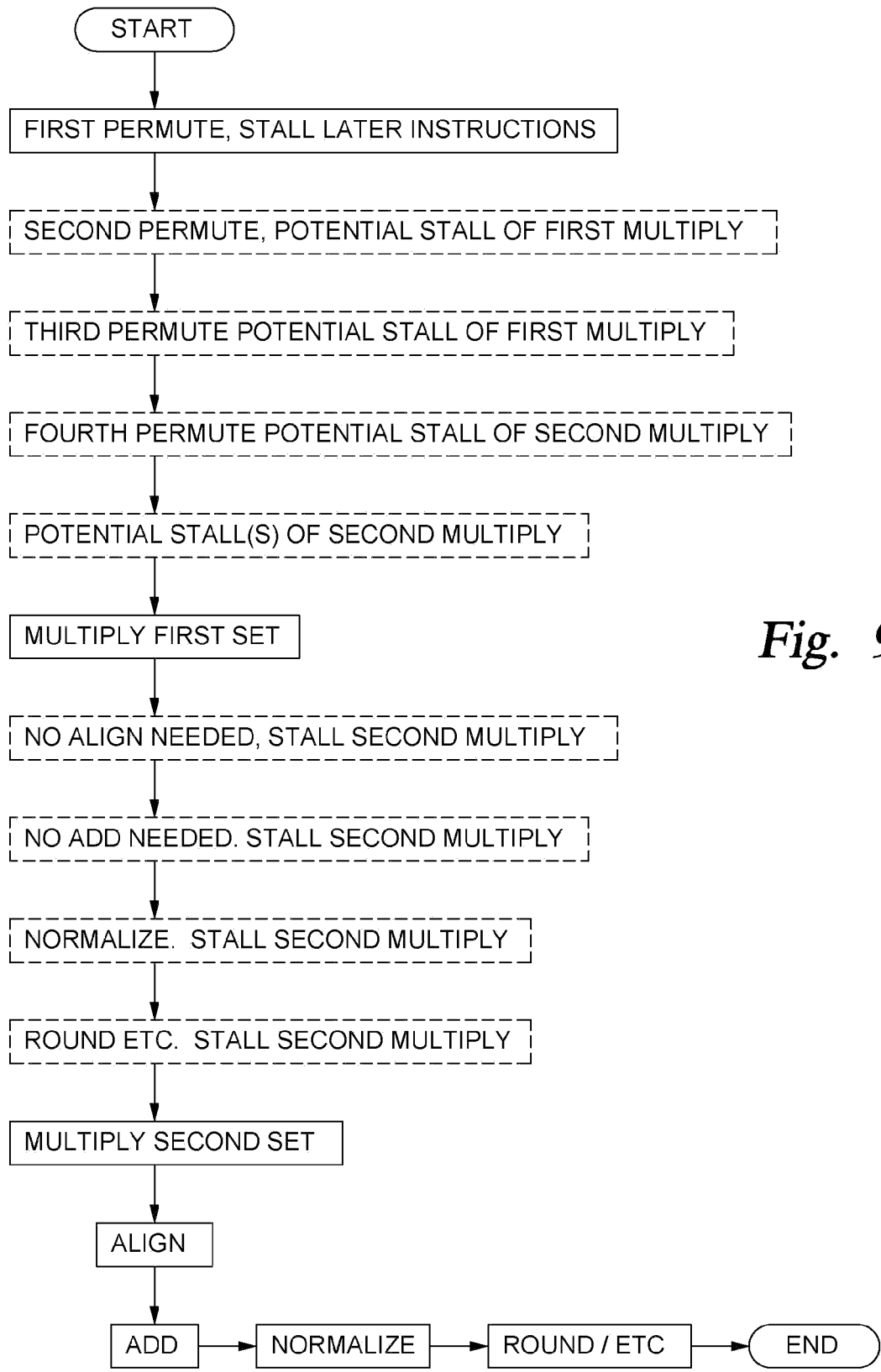
FIG. 9B illustrates stalling of the pipeline while executing the code in FIG. 9A.

FIG. 9B illustrates the stalling of the pipeline between the cross product instructions illustrated in FIG. 9A. As illustrated in FIG. 9B, performing the cross product may begin by performing the permute instructions 901. As illustrated, performing the permute instructions 901 may involve stalling execution of the first multiply instruction 902. The stalled stages are illustrated in dashed boxes in FIG. 9B. The stalling of the first multiply instruction may be performed to allow operands for the first multiply operation to be properly located in the appropriate registers.

FIG. 9B also illustrates stalling of the pipeline between the first multiply instruction 902 and the second multiply instruction 903. The stalling of the pipeline between the first multiply instruction and the second multiply instruction may be performed to allow the results of the first multiply instruction to be available to the second multiply instruction. Therefore, as illustrated in FIG. 9B, the second multiply instruction may not enter the pipeline until the completion of the rounding stage of the first multiply instruction.

Dual Vector Unit Implementation

In one embodiment of the invention, a dual vector unit may be implemented to improve processing of vector instructions. Accordingly, two independent vector units may be provided. The two vector units may access the same register file. Furthermore, the dual vector units may include a scalar processing lane, thereby integrating the processing of vector and scalar instructions.

Figure 10:
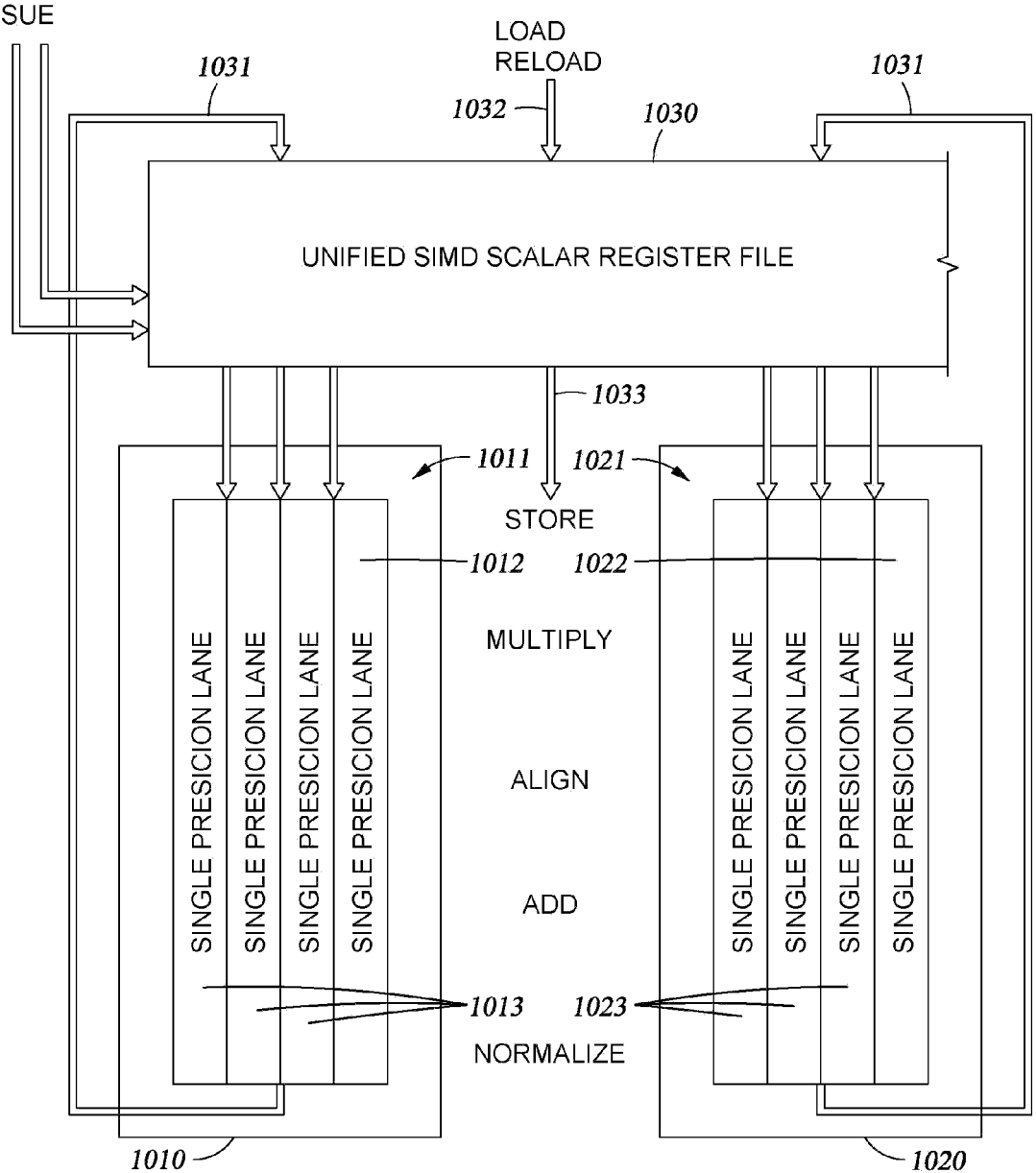
FIG. 10 illustrates a dual vector processing unit according to an embodiment of the invention.

FIG. 10 illustrates a dual vector unit according to an embodiment of the invention. As illustrated in FIG. 10, the dual vector unit may include a first vector unit 1010 and a second vector unit 1020. Each vector unit may be configured to receive data from one or more registers of the same register file 1030 through one or more lanes coupling register file 1030 to vector units 1010 and 1020. For example, three lanes 1011 couple the register file with vector unit 1011 and three lanes 1021 couple the register file with vector unit 1020.

The lanes 1011 and 1021 may be similar to the lanes 720 in FIG. 7 coupling register file 710 with vector unit 700. In one embodiment of the invention lanes 1011 and 1021 may be 128-bits wide to provide data from 128 bit wide registers in register file 1030 to vector units 1010 and 1020 respectively. One skilled in the art will recognize that the number of lanes coupling the vector units to the register file are not limiting on the invention. Any reasonable number of lanes may be provided to couple each vector unit with the register file. Furthermore, one vector unit need not have the same number of lanes as the other vector unit.

One advantage of the embodiment illustrated in FIG. 10 is that a plurality of vector units may be implemented without the complexity and consumption of additional space for adding more register files for each vector unit. Register file 1030 may be arranged in a manner similar to register file 710 in FIG. 7, and may have a plurality of registers configured to store vector and scalar data.

Additionally, register file 1030 may be configured to simultaneously issue instructions to vector units 1010 and 1020, via, for example, the lanes 1011 and 1021. For example, a first instruction may be issued to vector unit 1010 and a second instruction may be independently issued to vector unit 1020, thereby allowing two separate instructions to be processed in parallel. By processing instructions in parallel performance may be greatly improved.

The register file may also include one or more write ports 1031. Write ports 1031 may be configured to receive results from each of the vector units 1010 and 1020 and store the results in a register within the register file. In one embodiment of the invention the write ports may simultaneously write data into different registers in the register file. However, two or more write ports may not write data simultaneously to the same register in the register file.

Register file 1030 may also include a read port 1032 and write port 1033 for exchanging data with memory. For example, data from a register in register file 1030 may be exchanged with memory via ports 1032 and 1033 via load and store instructions.

Another advantage of the dual vector unit illustrated in FIG. 10 is that each vector unit includes a scalar processing lane in addition to the vector processing lanes. For example, vector unit 1010 includes three vector processing lanes 1013 and an overlaid scalar processing lane 1012. Similarly, vector unit 1020 includes three vector processing lanes 1023 and an overlaid scalar processing lane 1022. Each scalar lane 1012 and 1022 may be configured to perform a scalar operation. Therefore, vector and scalar operations may be performed in parallel.

For example, a scalar instruction may be issued to vector unit 1010 and a vector instruction may be issued to vector unit 1020. The vector and scalar operation may be performed in parallel, provided there are no dependencies between the instructions. The scalar operation may be performed in the scalar lane 1012 of vector unit 1010, and the vector operation may be performed in the vector processing lanes 1023 of vector unit 1020. More generally, however, any combination of vector and scalar instructions may be independently issued to the vector units 1010 and 1020, thereby improving performance.

Furthermore, by allowing vector units to perform scalar operations, the inefficiencies of transferring data between vector units and scalar units is avoided. As previously described, the prior art required the use of memory as a medium to exchange data between vector and scalar units. The exchange of data with memory may be very inefficient. By allowing the scalar data and vector data to be available in the register file to a vector unit configured to process scalar instructions, the inefficiencies of implementing separate scalar and vector units is obviated.

Performing Cross Products with Dual Vector Unit

In one embodiment of the invention, one or more resources of one vector unit may be shared with a second vector unit to perform a vector operation, for example, a cross product or dot product operation. Therefore, one or more processing lanes or elements from one vector unit may be utilized by another vector unit to perform an operation.

As previously discussed performing a cross product operation with a single vector unit may require multiple permute and multiply instructions. Furthermore, a plurality of stalls may occur in the pipeline executing the multiple instructions, thereby affecting performance. One advantage of the dual vector unit is that by sharing resources between the two vector units may allow a single instruction to perform a vector operation, for example, a cross product operation. Therefore, the number of instructions and wasted stall cycles between dependent instructions may be significantly reduced.

For example, the first multiply instruction 902 and second multiply instruction 903 in FIG. 9A may be replaced with a single cross product instruction. Because, in a dual vector unit, eight multipliers are available, six of the eight multipliers may be used to perform all multiplications for the cross product operation in a single cycle. The results from the multipliers may be routed to three adders for performing the subtraction operations. Therefore, the cross product may be performed with a single instruction.

FIG. 11 illustrates the sharing of resources between dual vector units to perform a cross product operation. As illustrated in FIG. 11, the cross product operation may be performed in processing lanes 1111-1114 of vector unit 1110 and processing lanes 1121-1122 of vector unit 1120. In one embodiment of the invention, because both vector units are used to perform the cross product operation, the register file may be configured to issue a single (rather than dual and independent) instruction. In one embodiment of the invention, because a scalar lane may be available in vector unit 1120, a cross product operation and a scalar operation may be performed simultaneously, thereby allowing dual independent instruction issue while performing a cross product operation.

In one embodiment of the invention, to reduce the number of permute instructions and the stall cycles caused by the permute instructions, one or more operand muxes 1130 may be provided at the input of the multipliers. Operand muxes 1130 may be configured to select an operand available through one of the lanes connecting the register file to the vector units 1110 and 1120, and provide the operand to input of a respective multiplier.

Figure 11A:
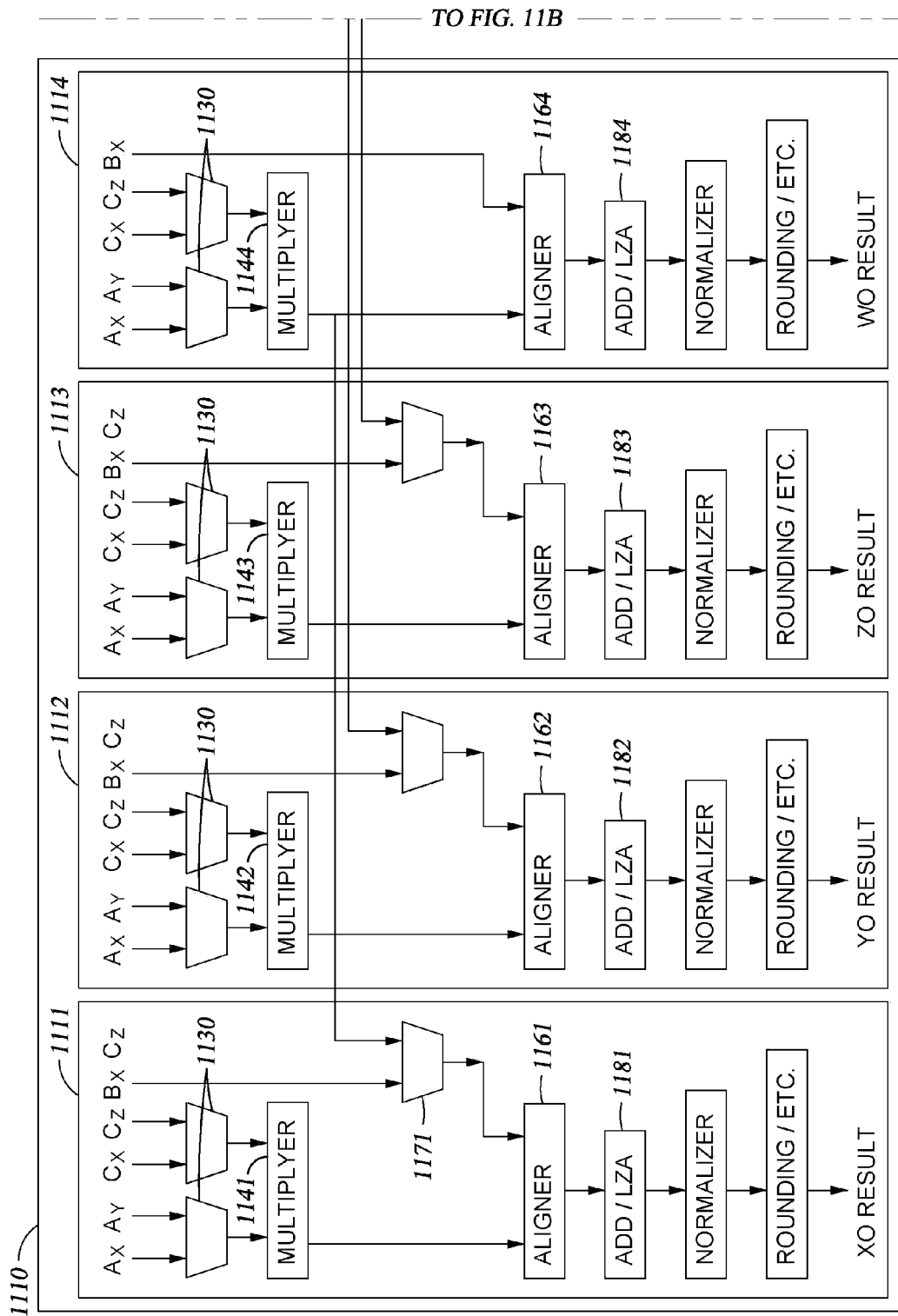
FIG. 11 (shown on two pages as FIGS. 11A and 11B) illustrates a dual vector processing unit configured to perform a cross product operation, according to an embodiment of the invention.
Figure 11B:
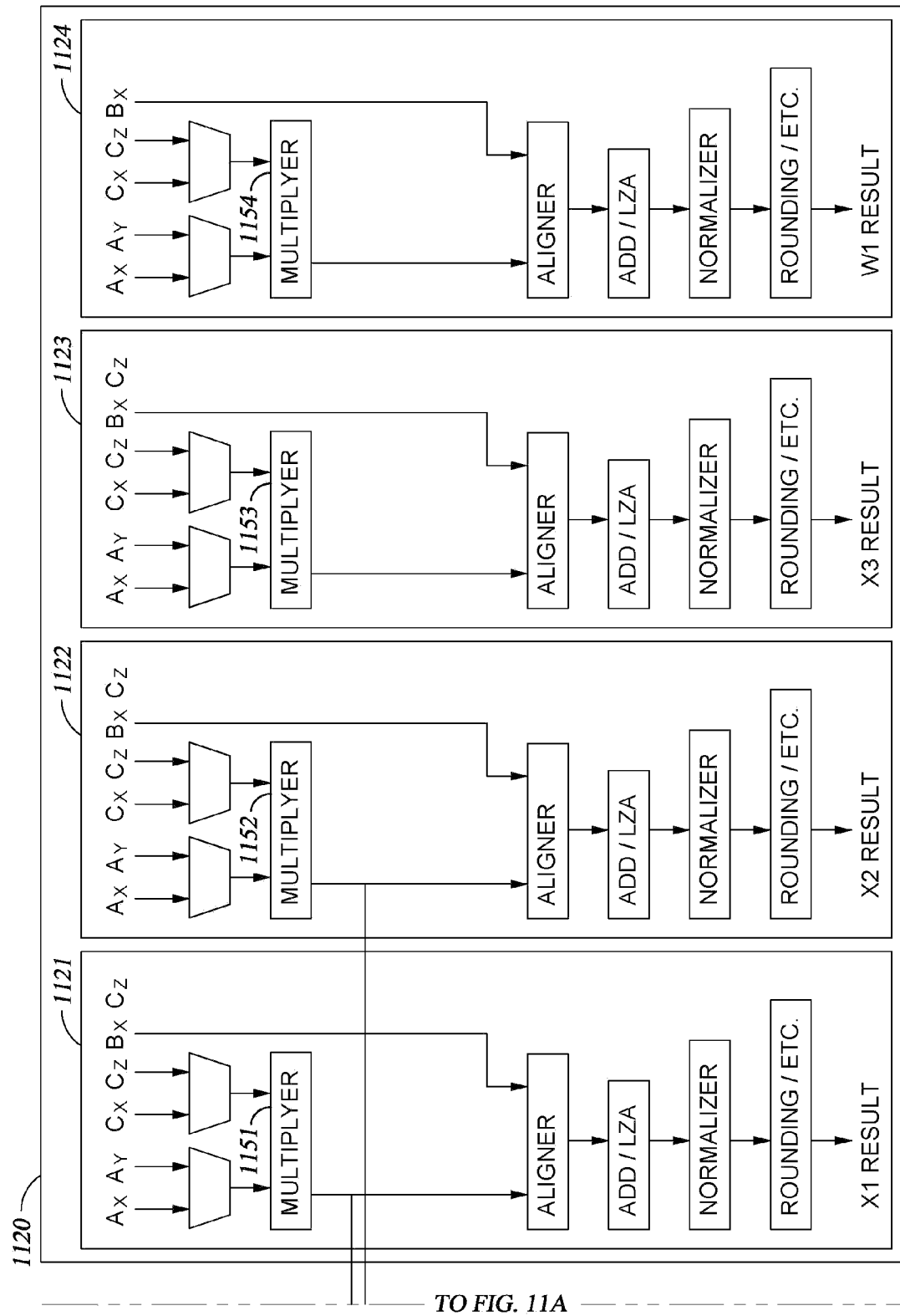

As illustrated in FIG. 11 (shown on two pages as FIGS. 11A and 11B), multipliers in vector units 1110 and 1120 may compute the products necessary for performing the cross product operation. For example, multipliers 1141-1144 of vector unit 1110 and multipliers 1151-1154 of vector unit 1120, each compute a product. The products computed by the multipliers may be routed to three aligners aligning the products. For example, the products from multipliers 1141 and 1144 are routed to aligner 1161, the products from multipliers 1142 and 1151 are routed to aligner 1162, and the products from multipliers 1143 and 1152 are routed to aligner 1163, as illustrated. A multiplexer, for example multiplexer 1171, may be provided at the input of each aligner to select one of the product received from a multiplier in a different processing lane and an input received in the processing lane of the aligner.

The aligned products may then be subtracted. For example, adder 1181 may subtract the products aligned by aligner 1161, adder 1182 may subtract the products aligned by aligner 1162, and adder 1183 may subtract the products aligned by aligner 1163.

The differences computed by adders 1181-1183, may be normalized and rounded to provide the result (the normal vector) of the cross product operation. For example, in one embodiment, processing lane 1111 may produce the x-coordinate of the normal vector, processing lane 1112 may produce the y-result of the normal vector, and processing lane 1113 may produce the z-result of the normal vector. The normal vector may be stored back to the register file using a write back path associated with vector unit 1110.

One skilled in the art will recognize that the particular method of processing illustrated in FIG. 11 and described above is not limiting on the invention. More generally, any one of the available multipliers in vector units 1110 and 1120 may be selected to perform the multiplications for the cross product operation. Furthermore, the products computed by the multipliers may be routed to any available aligners and adders for performing the subtraction. Therefore, the results of the cross product may be derived from any available processing lane in the vector units.

Figure 12:
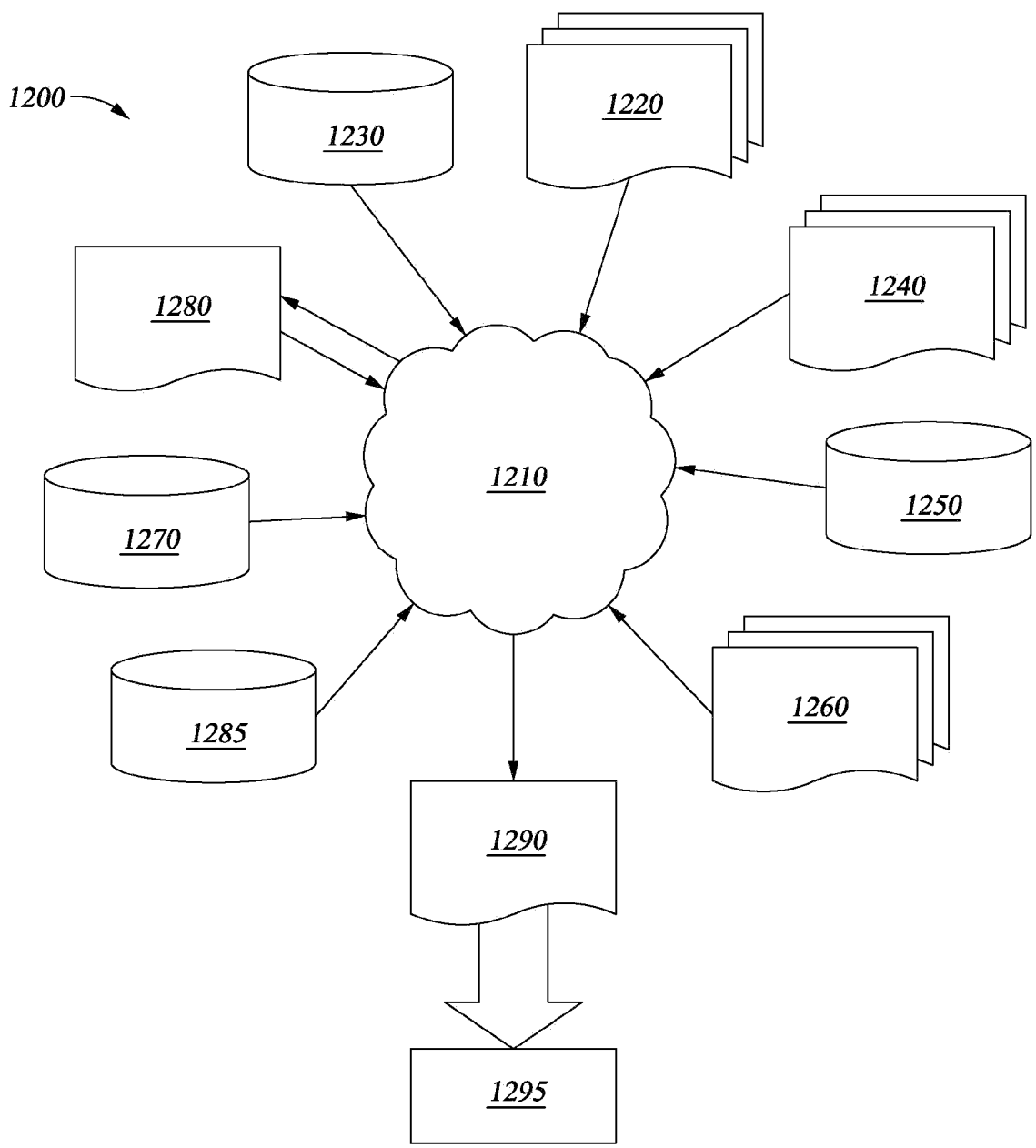
FIG. 12 is a flow diagram of a design process used in semiconductor design, manufacturing, and/or test.

FIG. 12 shows a block diagram of an example design flow 1200. Design flow 1200 may vary depending on the type of IC being designed. For example, a design flow 1200 for building an application specific IC (ASIC) may differ from a design flow 1200 for designing a standard component. Design structure 1220 is preferably an input to a design process 1210 and may come from an IP provider, a core developer, or other design company or may be generated by the operator of the design flow, or from other sources. Design structure 1220 comprises the circuits described above and shown in FIGS. 1, 2, 7, 8, 10, 11A, and 11B in the form of schematics or HDL, a hardware-description language (e.g., Verilog, VHDL, C, etc.). Design structure 1220 may be contained on one or more machine readable medium. For example, design structure 1220 may be a text file or a graphical representation of circuit 1200. Design process 1210 preferably synthesizes (or translates) the circuits described above in and shown in FIGS. 1, 2, 7, 8, 10, 11A, and 11B into a netlist 1280, where netlist 1280 is, for example, a list of wires, transistors, logic gates, control circuits, I/O, models, etc. that describes the connections to other elements and circuits in an integrated circuit design and recorded on at least one of machine readable medium. This may be an iterative process in which netlist 1280 is resynthesized one or more times depending on design specifications and parameters for the circuit.

Design process 1210 may include using a variety of inputs; for example, inputs from library elements 1230 which may house a set of commonly used elements, circuits, and devices, including models, layouts, and symbolic representations, for a given manufacturing technology (e.g., different technology nodes, 32nm, 45 nm, 90 nm, etc.), design specifications 1240, characterization data 1250, verification data 1260, design rules 1270, and test data files 1285 (which may include test patterns and other testing information). Design process 1210 may further include, for example, standard circuit design processes such as timing analysis, verification, design rule checking, place and route operations, etc. One of ordinary skill in the art of integrated circuit design can appreciate the extent of possible electronic design automation tools and applications used in design process 1210 without deviating from the scope and spirit of the invention. The design structure of the invention is not limited to any specific design flow.

Design process 1210 preferably translates an embodiment of the invention as described above and shown in FIGS. 1, 2, 7, 8, 10, 11A, and 11B, for example, along with any additional integrated circuit design or data (if applicable), into a second design structure 1290. Design structure 1290 resides on a storage medium in a data format used for the exchange of layout data of integrated circuits (e.g. information stored in a GDSII (GDS2), GL1, OASIS, or any other suitable format for storing such design structures). Design structure 1290 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as described above and shown in FIGS. 1, 2, 7, 8, 10, 11A, and 11B, for example. Design structure 1290 may then proceed to a stage 1295 where, for example, design structure 1290: proceeds to tape-out, is released to manufacturing, is released to a mask house, is sent to another design house, is sent back to the customer, etc.

CONCLUSION

By implementing dual vector units configured to independently execute instructions in parallel, in some cases, or share resources to perform operations like "large scale" cross products and dot products in other cases, image processing becomes more efficient, thereby allowing the display of more realistic images and animation.

While the foregoing is directed to embodiments of the present invention, other and further embodiments of the invention may be devised without departing from the basic scope thereof, and the scope thereof is determined by the claims that follow.

What is claimed is:

1. A design structure embodied in a non-transitory machine readable storage medium for at least one of designing, manufacturing, and testing a design, wherein the design structure resides on the storage medium as a data format used for an exchange of layout data of integrated circuits, the design structure, when implemented by executing instructions on a computer, provides elements comprising:
   a processor comprising:
      a shared register file, wherein the shared register file contains a plurality of instructions;
      a first vector unit communicatively connected to the shared register file to receive one or more of the plurality of instructions; and
      a second vector unit communicatively connected to the shared register file to receive one or more of the plurality of instructions,
      wherein the first vector unit and the second vector unit each comprise a plurality of vector processing lanes configured to execute a vector instruction from the plurality of instructions and at least one scalar processing lane configured to execute a scalar instruction from the plurality of instructions, the first vector unit and the second vector unit being configured to independently and simultaneously execute instructions, and
      wherein the first vector unit and the second vector unit are configured to execute a single vector instruction from the plurality of the instructions in the plurality of vector processing lanes of the first vector unit and one or more of the plurality of vector processing lanes of the second vector unit.

2. The design structure of claim 1, wherein the design structure comprises a netlist, which describes the processor.

3. The design structure of claim 1, wherein the design structure includes at least one of test data files, characterization data, verification data, or design specifications.

4. A design structure embodied in a non-transitory machine readable storage medium for at least one of designing, manufacturing, and testing a design, wherein the design structure resides on the storage medium as a data format used for an exchange of layout data of integrated circuits, the design structure comprising:
   a system, comprising a plurality of processors communicably coupled with one another,
   wherein each processor comprises:
      a shared register file, wherein the shared register file contains a plurality of instructions;
      a first vector unit communicatively connected to the shared register file to receive one or more of the plurality of instructions; and
      a second vector unit communicatively connected to the shared register file to receive one or more of the plurality of instructions,
      wherein the first vector unit and the second vector unit each comprise a plurality of vector processing lanes configured to execute a vector instruction from the plurality of instructions and at least one scalar processing lane configured to execute a scalar instruction from the plurality of instructions, the first vector unit and the second vector unit being configured to independently and simultaneously execute instructions, and
      wherein the first vector unit and the second vector unit are configured to execute single vector instruction from the plurality of instructions in the plurality of vector processing lanes of the first vector unit and one or more of the plurality of vector processing lanes of the second vector unit.

5. The design structure of claim 4, wherein the design structure comprises a netlist, which describes the system.

6. The design structure of claim 4, wherein the design structure includes at least one of test data files, characterization data, verification data, or design specifications.

* * * * *